United States Patent [19]

Boyer et al.

[11] Patent Number: 5,542,583
[45] Date of Patent: Aug. 6, 1996

[54] DUAL CHAMBER VACUUM STORAGE AND DISPENSER FOR COFFEE BEANS

[75] Inventors: Samuel R. Boyer, Golden; Michael Sitz, Thornton; Paul Svaldi, Golden, all of Colo.

[73] Assignee: Brother's Gourmet Coffee, Inc., Boca Raton, Fla.

[21] Appl. No.: 204,477

[22] Filed: Mar. 1, 1994

[51] Int. Cl.⁶ ................................................. B65D 47/18
[52] U.S. Cl. ........................... 222/425; 222/438; 222/445; 222/450
[58] Field of Search ..................... 222/425, 438, 222/445, 447, 448, 450, 1, 152, 80, 185.1; 414/221; 137/242

[56] References Cited

U.S. PATENT DOCUMENTS

| | | |
|---|---|---|
| 381,350 | 4/1888 | Ehlers ........................ 222/447 |
| 1,378,377 | 5/1921 | Heathcote .................... 222/447 |
| 1,469,879 | 10/1923 | Bott ........................... 222/450 X |
| 1,891,038 | 12/1932 | Barros ........................ 222/438 |
| 2,116,300 | 5/1938 | Campos ...................... 221/106 |
| 3,204,833 | 9/1965 | Weintzner ................... 222/355 |
| 3,735,899 | 5/1973 | Rollinson .................... 222/135 |
| 3,788,368 | 1/1974 | Geng et al. .................. 222/450 X |
| 3,841,347 | 10/1974 | Kushida ...................... 137/242 |
| 4,569,463 | 2/1986 | Pelligrino .................... 222/187 |
| 5,275,215 | 1/1994 | Derby ......................... 222/450 X |

FOREIGN PATENT DOCUMENTS

| | | |
|---|---|---|
| 946324 | 4/1974 | Canada ........................ 222/152 |
| 343090 | 11/1989 | European Pat. Off. ........ 222/450 |
| 0424326A1 | 4/1991 | European Pat. Off. . |
| 419843 | 10/1925 | Germany ..................... 222/445 |
| 150643 | 1/1932 | Switzerland ................. 222/445 |
| 2259910 | 3/1993 | United Kingdom . |

Primary Examiner—Andres Kashnikow
Assistant Examiner—Lisa Douglas
Attorney, Agent, or Firm—Dorr, Carson, Sloan & Birney, P.C.

[57] ABSTRACT

A system and method for storing coffee beans in a vacuum environment and dispensing them into an external environment at atmospheric pressure is provided. An upper valve selectively passes coffee beans from a hopper to a metering chamber when open and forms an airtight seal between the metering chamber and the hopper when closed. A lower valve selectively dispenses the coffee beans from the metering chamber when open and forms an airtight seal between the metering chamber and the external environment when closed. An actuator mechanism synchronously operates the upper and lower valves to establish and maintain a vacuum environment in the hopper while dispensing an accurate quantity of coffee beans on demand.

18 Claims, 9 Drawing Sheets

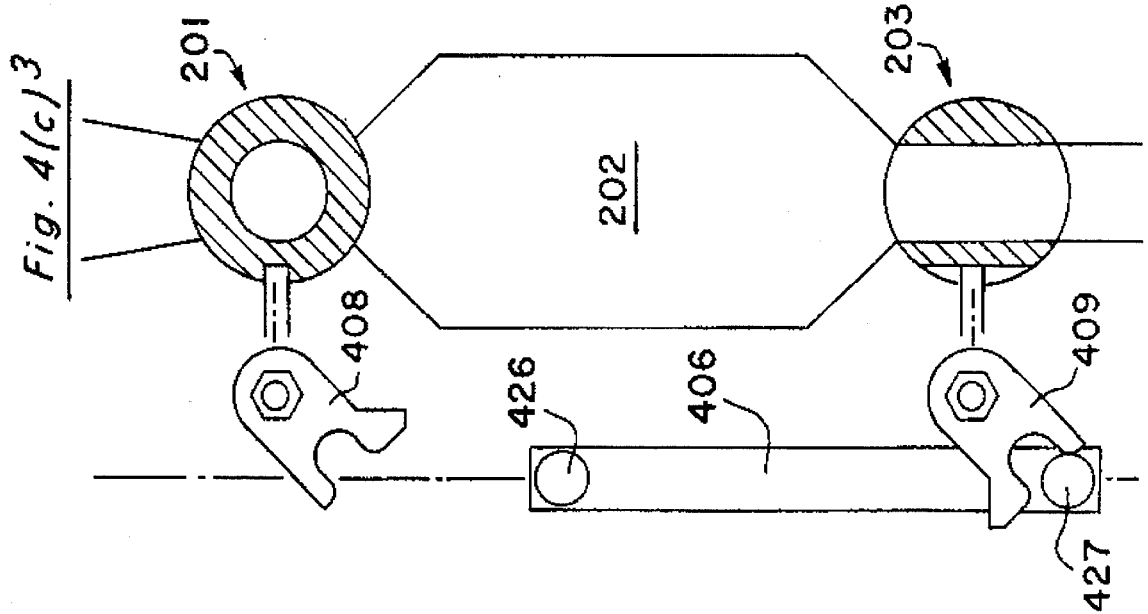
Fig. 4(c)³
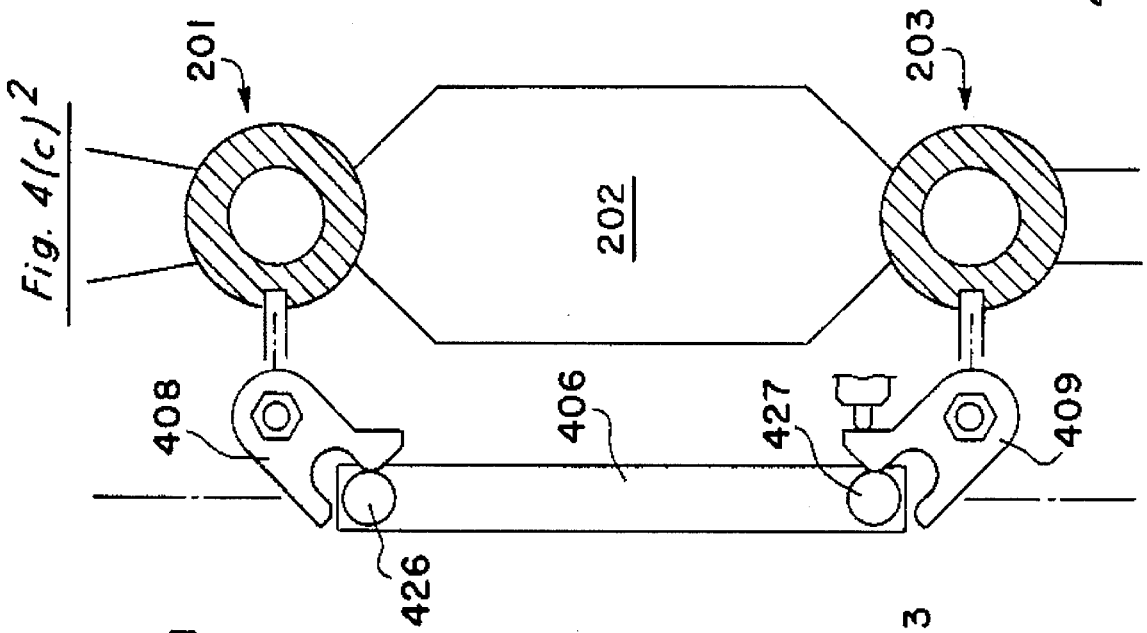
Fig. 4(c)²
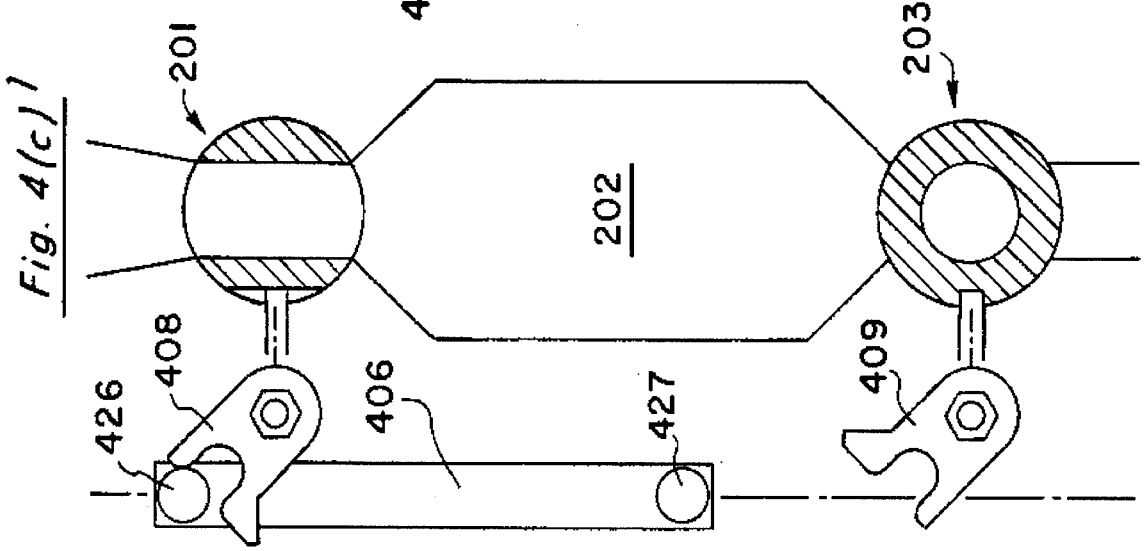
Fig. 4(c)¹

DUAL CHAMBER VACUUM STORAGE AND DISPENSER FOR COFFEE BEANS

BACKGROUND OF THE INVENTION

1. Field of the Invention

The present invention relates, in general to dispensing devices and, more particularly, to dispensing devices for flowable food products such as coffee or similar material.

2. Statement of the Problem

Many products are benefited by storage in a vacuum or reduced pressure environment until they are used. This is particularly true of many food products and especially true of roasted coffee beans. Coffee beans are known to lose their aroma, flavor, and essential oils when stored for even short periods of time at standard atmosphere pressure. Coffee beans are negatively affected by humidity and moisture in the air also. This is why coffee manufacturers have shipped coffee in vacuum packed canisters in order to preserve flavor and freshness and increase shelf life of the coffee. While simply storing the product in a sealed container at atmospheric pressure helps preserve the product, it has long been known that vacuum storage is preferable.

Roast coffee bean sales are a growing portion of the coffee market. Coffee tends to lose flavor more quickly once ground. Consumers who recognize this tendency purchase coffee beans rather than ground coffee. The consumers grind the coffee beans as needed to provide the ultimate in freshness. This also allows the consumer to blend the coffees to suit their particular taste by mixing grinds from selected varieties and roasts of beans. While coffee beans are less susceptible to flavor loss than is ground coffee, loss of flavor due to storage at atmospheric pressure is still a major concern for coffee distributors.

A popular way to store and dispense fresh roasted coffee beans is at the retail level by providing a dispenser on a supermarket or cafe shelf that the consumer can use to select and dispense a desired quantity and variety of roasted coffee beans. It is important that the dispenser be easy to use so that an untrained consumer has little trouble. The dispenser must also be mechanically simple so as to have long service life with little maintenance for the grocer or the distributor.

The dispenser must also be easy to refill with fresh roasted beans, and preferably allows the consumer to view the coffee bean while they are being stored. This is because the color and texture of the beans is an important indicator of quality that consumers wish to know before purchasing the roasted beans.

Coffee dispensers, as do all food dispensers, must be highly hygienic. This requirement dictates that the dispensers should be easy to disassemble so that they can be easily cleaned and sanitized. It is also desirable that the dispenser provide a metered amount of coffee beans so that the consumer does not need to measure the product after it is dispensed. If the consumer has to measure the product, some of the product will be discarded when too much is dispensed and the consumer may be upset if too little is dispensed. In the case of a sealed coffee bean hopper where the consumer does not have access to the bulk of the product, this waste can be significant. It is desirable for the dispenser to provide a controlled, repeatable, metered amount of coffee beans each time it is used.

The measurement problem is more difficult in the case of coffee beans than in the case of ground coffee because coffee beans vary in density depending on the particular roast or variety of bean being dispensed. In other words, a quarter pound of one variety may take up more volume than a quarter pound of another variety making it difficult to accurately dispense a fixed quantity.

Conventional coffee bean dispensers include a hopper for storing the coffee beans at atmospheric pressure. The hopper is usually sealed to prevent dust and other particular contamination of the beans in the hopper. At the base of the hopper is a valve. The simplest form of valve may be simply a sliding pane which opens and closes a window at the base of the hopper. The coffee beans are fed by gravity through the valve to a product container such as a bag. Alternatively, the valve may incorporate a metering device such that a predetermined volume of coffee beans are dispensed each time the valve is operated.

U.S. Pat. No. 2,116,300 issued to Campos on May 3, 1938 shows a coffee dispenser adapted for ground coffee. This dispenser uses a sealed hopper and a metering valve which dispenses a fixed amount of ground coffee into a drawer at the base of the dispenser. The dispenser stores the coffee at room temperature, and is adapted only for ground coffee.

U.S. Pat. No. 3,204,833 issued to Weitzner on Sep. 7, 1965 shows a coffee dispenser which is similar to the Campos dispenser, but is adapted to dispense from a can of coffee rather than using a refillable hopper. The Weitzner dispenser uses a similar valve assembly to provide a metered amount of ground coffee with each operation of the valve.

U.S. Pat. No. 3,735,899 issued to Rollinson on May 29, 1973 shows a dispenser for granulated products which allows a number of hoppers supported on a single base. Each of the hoppers has a rotating valve at the base for dispensing a metered amount of product from the hopper. Although the hoppers are sealed in the Rollinson dispenser, the product is stored at atmospheric pressure.

U.S. Pat. No. 4,569,463 issued to Pellegrino on Feb. 11, 1986 shows a measuring and dispensing apparatus for dispensing a predetermined amount of a material that is contained in a hopper. The structure also uses a rotating metering valve and a sealed hopper. Again, the sealed hopper stores the product at atmospheric pressure. The rotating valve assembly in the Pellegrino dispenser has a removable insert to vary the volume of the metering valve to dispense different amounts of product with each operation.

European patent application publication number 424,326 A1 by Santino Locati published on Apr. 24, 1991 shows a ground coffee dispenser which has a sealed loading hopper and two metering assemblies. The metering chamber has a movable wall which varies the size to allow the volume of the metering chamber to be easily changed. By varying the size of the metering chamber, controlled amounts of the coffee can be mixed together to provide a selected coffee blend.

A need remains for a coffee storage system and dispenser that stores coffee beans or other food product in a reduced pressure or vacuum environment. Alternatively, a need exists for a coffee bean storage system and dispenser which stores coffee beans in a nitrogen or inert gas environment with low moisture content. A need also exists for an air lock and valve system for easily removing coffee beans from a vacuum storage container. A further need exists for a metering system which is easily adjustable and yet allows the coffee beans to remain under vacuum while in the metering chamber.

3. Solution to the Problem

The above identified problems and others are solved by a flowable food product dispenser having a storage hopper or chamber that can be pressurized or held at reduced pressure or vacuum. The dispenser of the present invention includes a valve assembly that maintains the flowable food product in a vacuum until dispensed from the hopper. The dispenser includes a metering chamber with easily adjustable size for dispensing a controlled volume or weight of product from the hopper. A mechanism is provided for easily operating the valve assembly and metering device so that operation of the dispenser is simple.

SUMMARY OF THE INVENTION

The present invention involves a system for storing flowable food product, in particular coffee beans, in a vacuum environment and dispensing them into an external environment at atmospheric pressure. An upper valve selectively passes coffee beans from a hopper to a metering chamber when open and forms an airtight seal between the metering chamber and the hopper when closed. A lower valve selectively dispenses the coffee beans from the metering chamber when open and forms an airtight seal between the metering chamber and the external environment when closed. An actuator mechanism synchronously operates the upper and lower valves to establish and maintain a vacuum environment in the hopper while dispensing an accurate quantity of flowable food product such as coffee beans on demand.

Figure 4A:
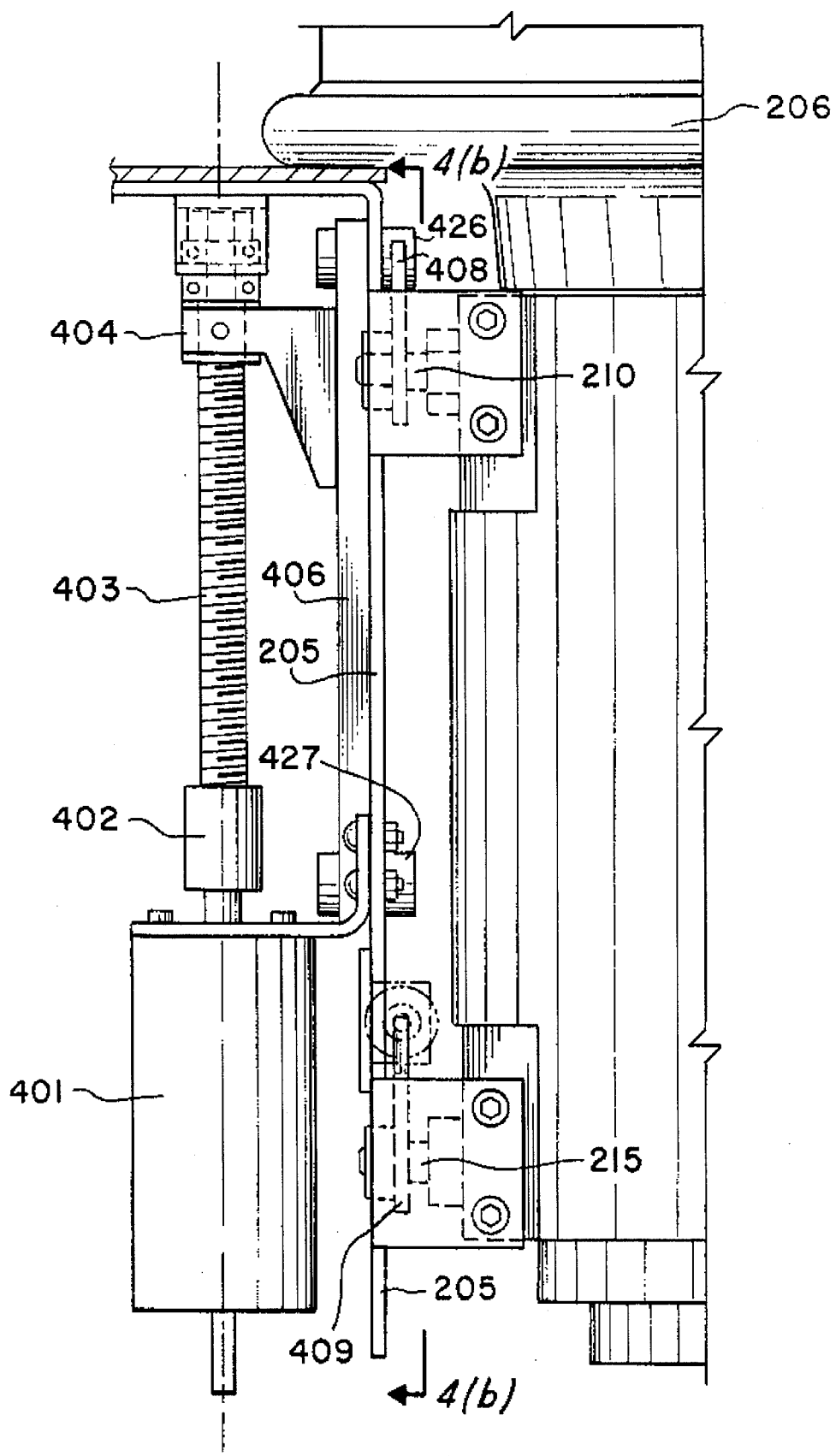
FIG. 4(a) shows a cross-sectional view of an actuator mechanism for driving the valve assembly shown in FIG. 2.
Figure 4B:
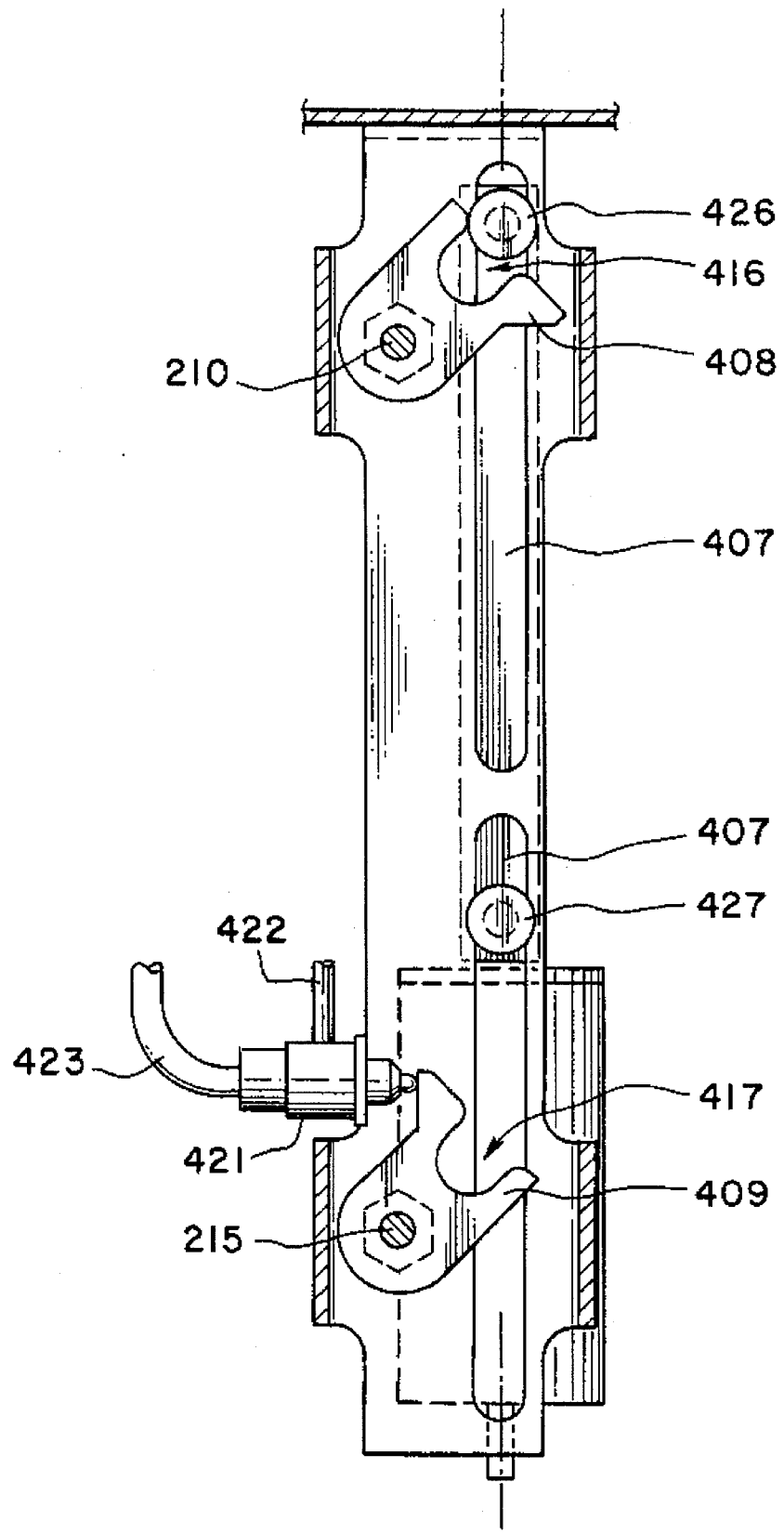
FIG. 4(b) shows a cross-sectional view of the actuator of FIG. 4(a) from another angle.
Figure 5:
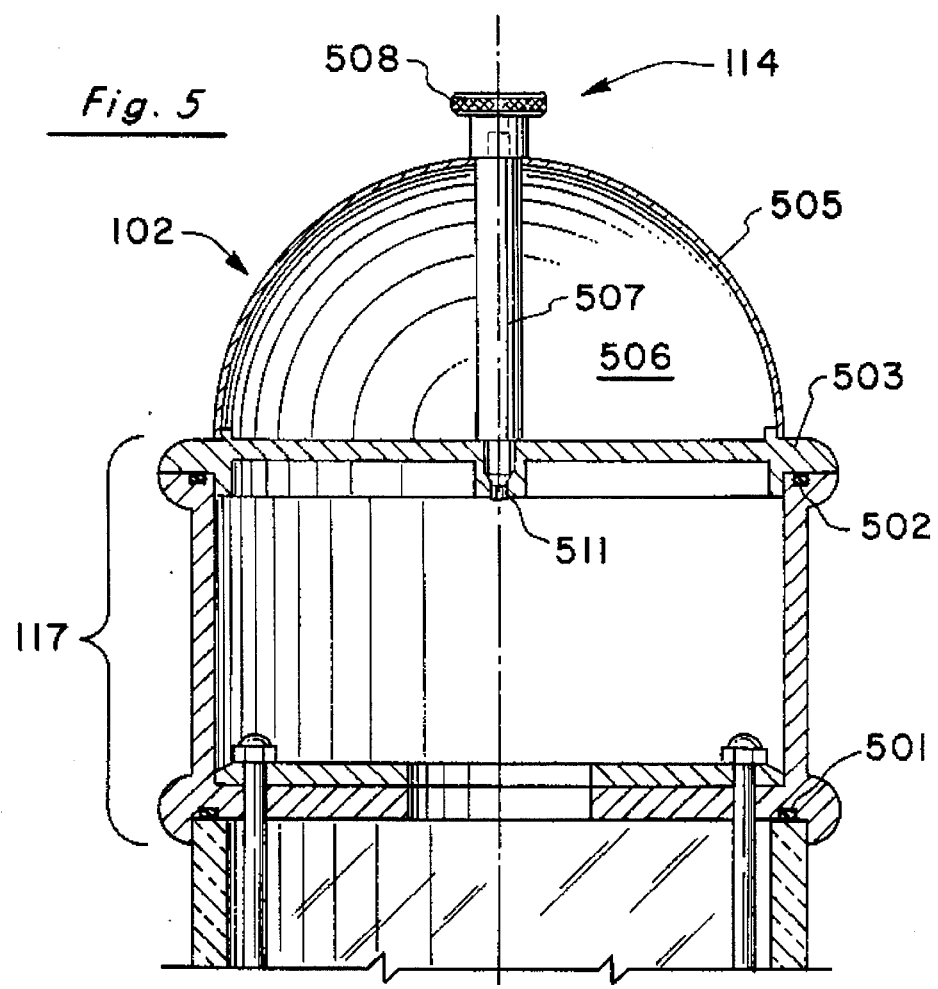
Figure 6:
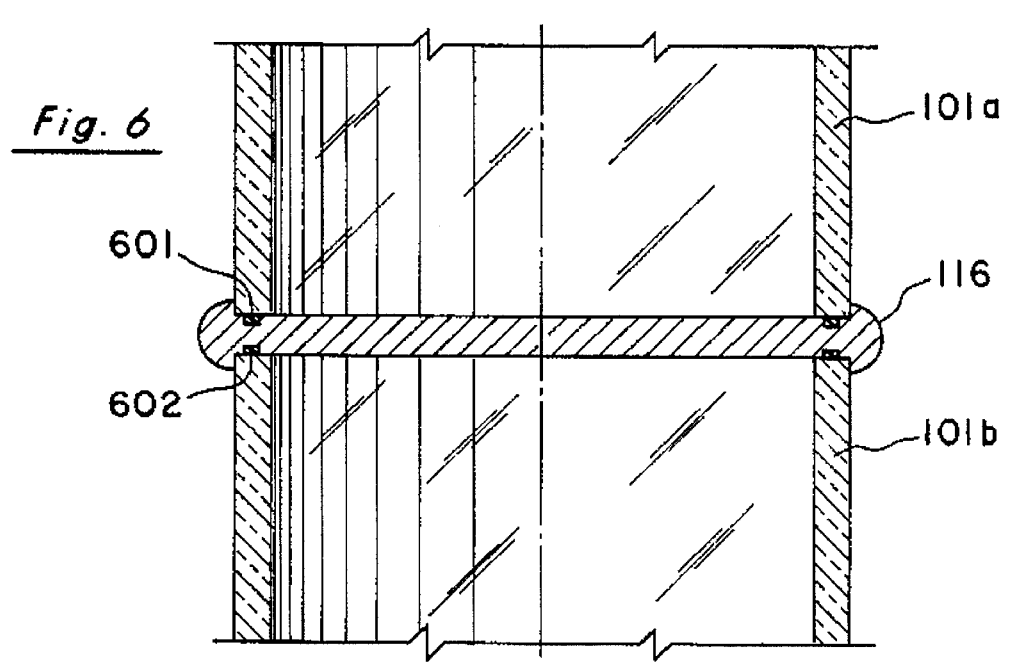
Figure 7:
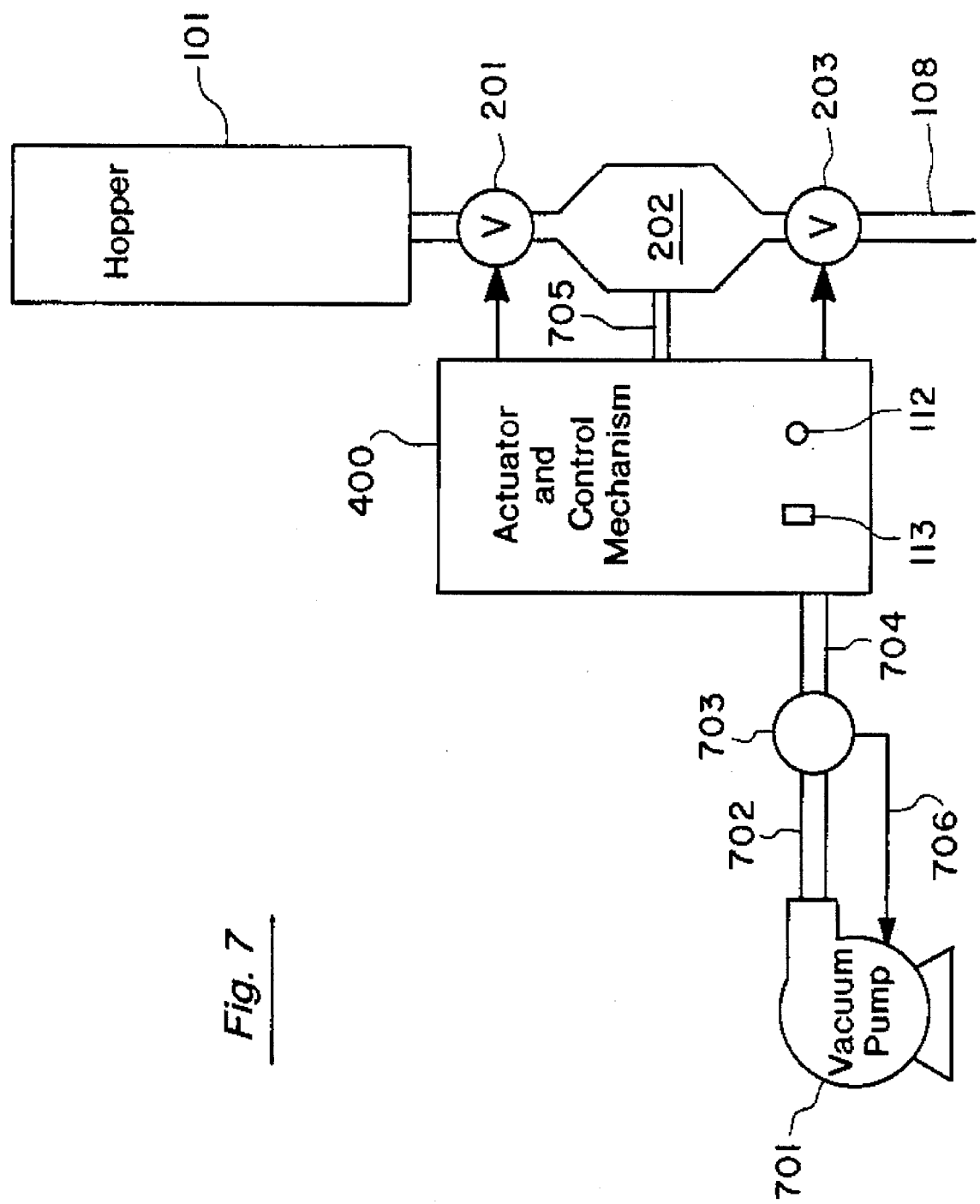
Figure 8:
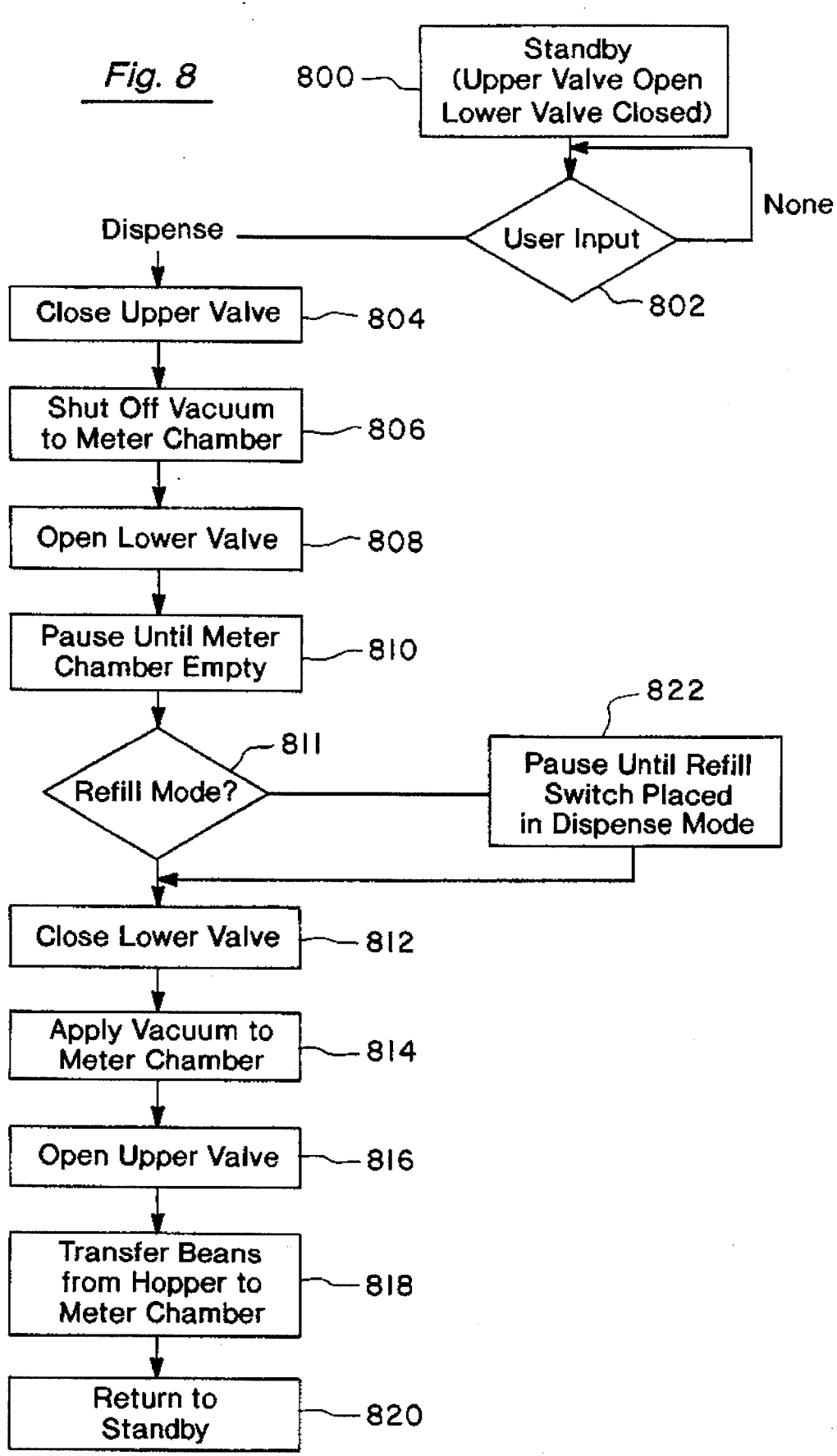

FIGS. $4(c)^1$–$4(c)^3$ illustrate a simplified view of the motion and operation of the actuator mechanism of FIG. 4(a) and FIG. 4(b);

FIG. 5 illustrates in cross section a top assembly for sealing the storage hopper of the dispenser in accordance with the present invention;

FIG. 6 illustrates in cross section an optional hopper assembly in accordance with the present invention;

FIG. 7 shows the schematic view of vacuum connections and control circuitry of the dispenser in accordance with the present invention; and FIG. 8 shows a flow chart of operation of the dispenser in accordance with the present invention.

DETAILED DESCRIPTION OF THE DRAWING

1. Overview

Figure 1:
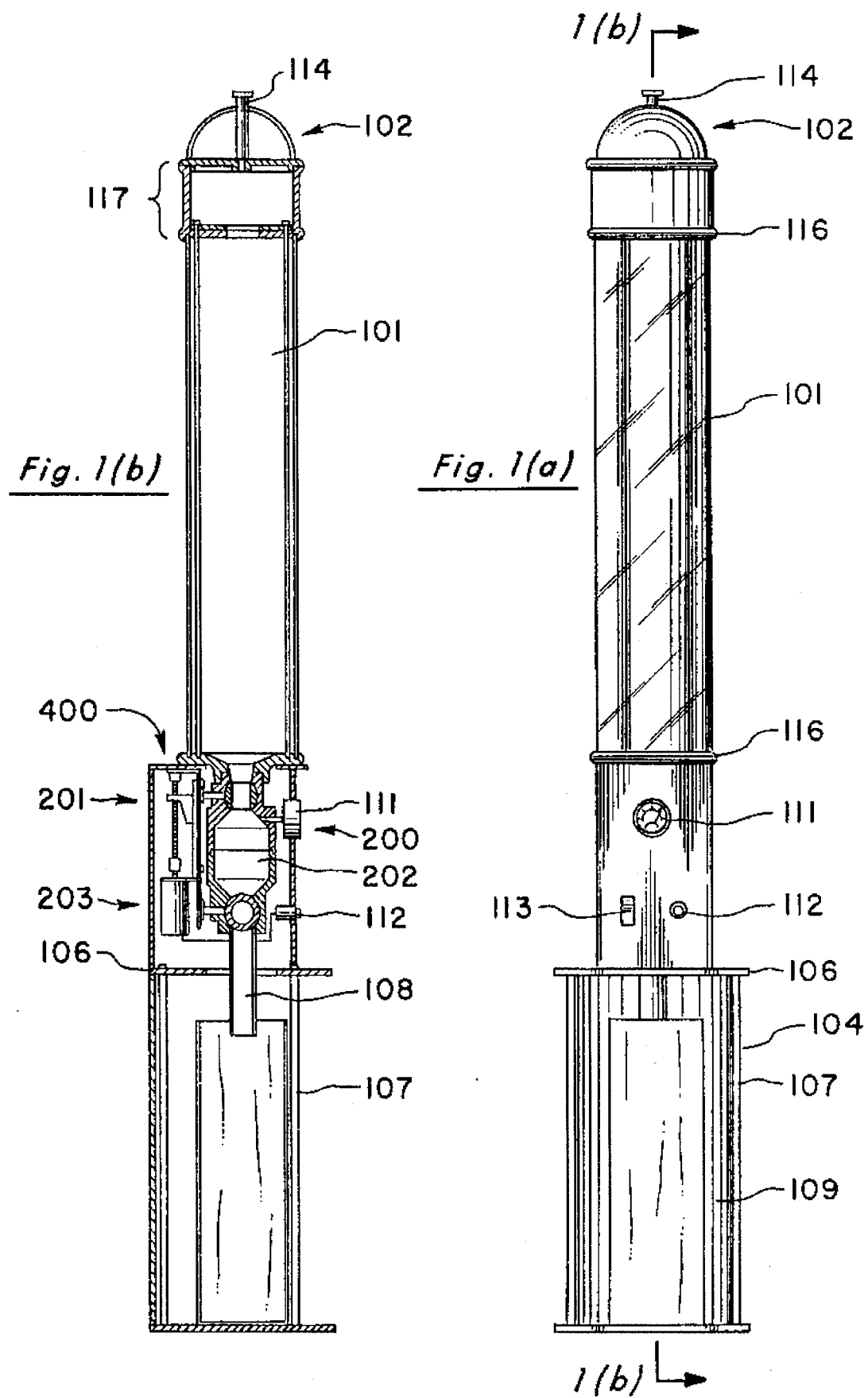
FIG. 1(a) shows a front perspective view of a dispenser in accordance with the present invention.
FIG. 1(b) shows the dispenser of FIG. 1(a) in cross section.

FIG. 1(a) and FIG. 1(b) show an overall view of the dual chamber storage and dispensing apparatus of the present invention. FIG. 1(a) and FIG. 1(b) are useful in understanding and coordinating the various component systems which are illustrated in FIG. 2 through FIG. 6. Unless otherwise indicated, the component systems may be arranged in any physical orientation in the dispenser in accordance with the present invention. The particular example shown in FIG. 1(a) and FIG. 1(b) is only a preferred assembly which is best embodies the concepts of the present invention.

As shown in FIG. 1(a), the basic components of the storage dispenser system in accordance with the present invention include a hopper cylinder 101, a top assembly 102, and a valve assembly enclosure 104. Hopper 101 is preferably a cylinder-shaped hollow tube sized to hold a convenient quantity of flowable food product such as coffee beans. Hopper 101 is made of glass, plastic or some other transparent material that can be safely placed under vacuum or pressure. Hopper 101 is a first chamber of the dual chamber dispenser 100 in accordance with the present invention. The size and shape of hopper 101 can be varied greatly to meet the demands of a particular application. For example, it is contemplated that hopper 101 can be modified to be a shorter cylinder with a rectangular cross-section so that several dispensers 100 can be placed close together on a grocery store shelf. Such modifications are matters of design choice within the scope of the present invention.

Top assembly 102 seals the upper end of hopper 101 and is dome shaped in a preferred embodiment. Top assembly 102 is removable when hopper 101 is at atmospheric pressure to allow hopper 101 to be filled. An air-tight seal is formed between top assembly 102 and hopper 101. A top assembly 102 includes a bleeder valve 114 which is used to bleed air into hopper 101 when it is desired to remove pressure from hopper 101.

Hopper 101 is located on top of valve enclosure 104. Valve enclosure 104 houses valve assembly 200 (shown in FIG. 1(b)) and actuator 400. On the front of valve assembly 104 is a vacuum gauge 111 used to monitor vacuum or pressure in hopper 101 and in meter chamber 202 of the valve assembly 200 (shown in FIG. 1(b)). Also on the outer surface of valve assembly housing 104 is switch 112 which is used to operate dispenser 100.

Valve assembly housing 104 is attached to a base plate 106 which provides mechanical support for the entire structure. Base plate 106 is placed on legs 107 which are sized to provide convenient access for the user. Dispenser 100 dispenses flowable food product such as coffee beans, which are removed from hopper 101 though chute 108 via valve assembly 200. The beans fall into a coffee container such as bag 109 provided by the customer or retailer. Optionally, a shroud may be wrapped around legs 107 to enclose three sides, allowing access to chute 108.

In the cross sectional view of FIG. 1(b), it can be seen that hopper 101 includes an upper portion 117. Upper portion 117 is optionally provided to support top assembly 102 including bleeder valve 114. In a preferred embodiment upper portion 117 is made of metal such as stainless steel rather than the transparent material used in the remainder of hopper 101. It should be understood, however, that upper portion 117 is optional only and top assembly 102 may seal directly to the glass portion of hopper 101 in accordance with the teachings of the present invention.

FIG. 1(b) shows valve assembly 200 with valve assembly housing 104 removed. In general, valve assembly 200 includes an upper valve 201, a metering chamber 202, and a lower valve 203. Upper valve 201 selectively couples the interior of hopper 101 to the interior of metering chamber 202. Lower valve 203 selectively couples the interior of metering chamber 202 to chute 108. Meter chamber 202 is the second chamber of the dual-chamber dispenser in accordance with the present invention.

Upper valve 201 is illustrated in an open position which would allow product in hopper 101 to be fed by gravity into metering chamber 202. Lower valve 203 is in a closed position so that product cannot leave metering chamber 202 through chute 108, and air cannot enter metering chamber 202 or hopper 101. Also enclosed in housing 104 is actuator assembly 400. Actuator assembly 400 is essentially a mechanical drive system which operates and controls upper valve 201 and lower valve 203 in response to user input from switch 112 (shown in FIG. 1(*a*)). Actuator assembly 400, as well as the other subsystems of the dispenser in accordance with the present invention will be described in greater detail herein below.

In summary, the dispenser and storage system in accordance with the present invention includes two chambers—hopper 101 for bulk storage of a large quantity of flowable food product such as coffee beans and second, metering chamber 202 for storing a limited, carefully measured quantity of the product from hopper 101. Upper and lower valves are provided on either side of metering chamber 202 so that metering chamber 202 forms an air lock. In normal operation, metering chamber 202 is under vacuum except when the lower valve is opened to dispense product.

Although the present invention is described in terms of a roasted coffee bean dispenser, it should be understood that any granular, semi-granular, or flowable product such as nuts, sugar, or powdered food products could be dispensed in accordance with method and apparatus of the present invention. Each of these products may benefit by improved shelf life and flavor retention due to the benefits of the vacuum storage system in accordance with the present invention. Likewise, although the present invention is described in terms of a vacuum storage system, it is a simple matter to covert the system to pressurized storage should that be desired. Also, an inert gas environment at atmospheric pressure using argon, nitrogen or helium may be used inside hopper 101 and metering chamber 202 to preserve quality. These modifications are within the skill of the ordinary machinist.

2. Valve Assembly Detail

Figure 2:
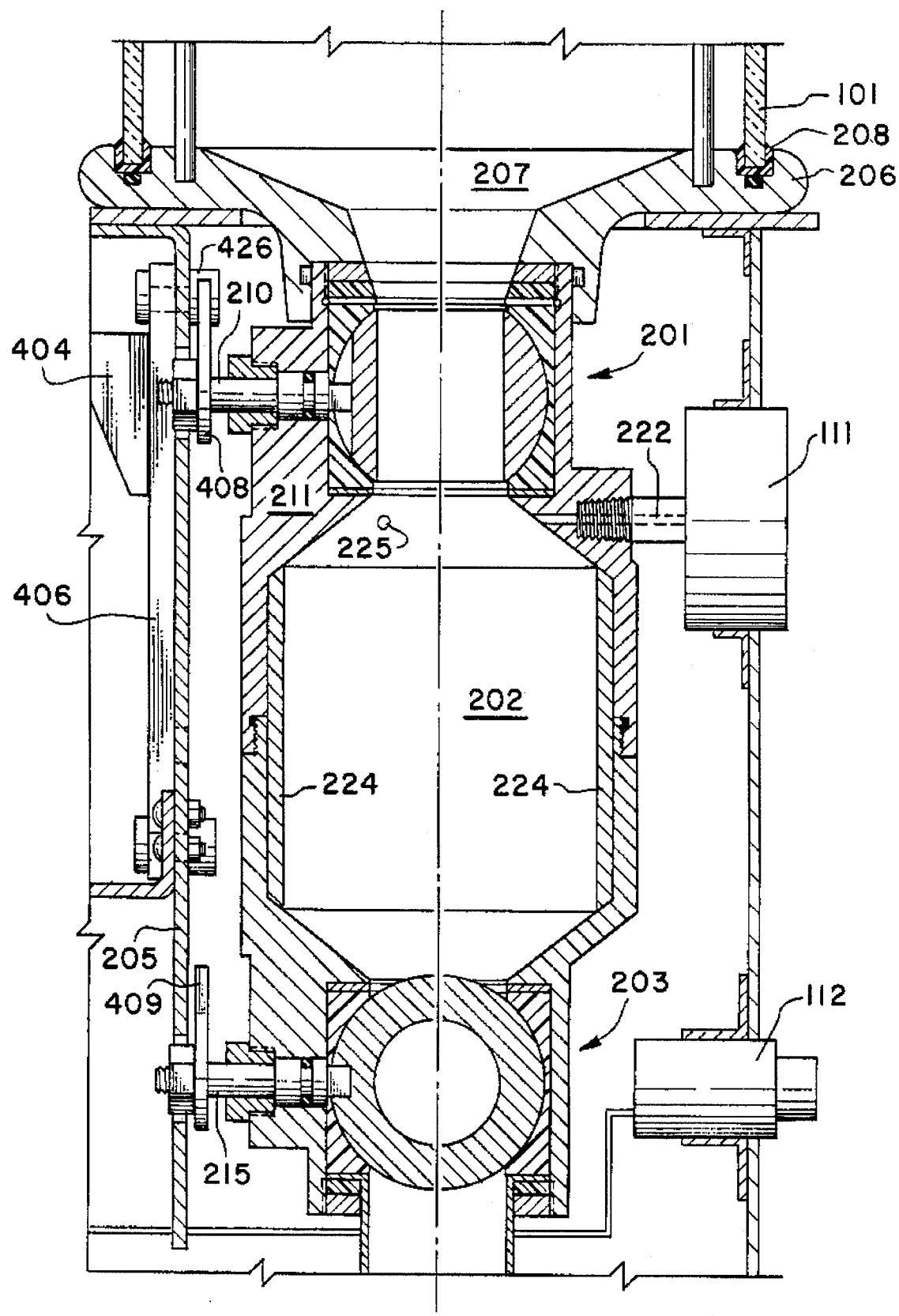
FIG. 2 illustrates an air lock valve assembly portion of the present invention in cross section in accordance with the present invention.

FIG. 2 illustrates an enlarged view of valve assembly 200 in accordance with the present invention. Major components of valve assembly 200 include upper valve 201, metering chamber 202, and lower valve 203. Hopper base 206 serves to couple upper valve 201 to hopper 101. Hopper base 206 has a circular groove cut to match the shape and position and to mate with the wall of hopper 101 to provide an airtight seal between base 206 and hopper 101. O-rings or other well known sealing mechanisms may be used. Base 206 includes a funnel-shaped interior portion 207 which is used to guide coffee beans from the interior of hopper 101 towards upper valve 201. Port 222 couples vacuum gauge 111 to the interior of meter chamber 202, although vacuum gauge 111 could easily be ported so as to measure vacuum at other locations if desired.

Upper valve 201 is shown in the open position in which coffee beans pass through funnel-shaped portion 207 to the interior of metering chamber 202. The details of valves 201 and 203 are discussed below in reference to FIG. 3. It is important to note that valve 201 includes a actuator coupling 210 that has a threaded end that extends through wall 211 to operate upper valve 201. The threaded end of actuator coupling 210 also extends through an alignment plate 205. Alignment plate 205 is rigidly affixed to hopper base 206 or otherwise attached to dispenser 100 so as to remain in a fixed position with respect to valve assembly 200.

Upper valve 201 is a preferably a ball valve consisting of a stainless steel ball which is rotated by turning actuator coupling 210 as suggested by the arrow in FIG. 2. The ball inside upper valve 201 has a hole bored through from one end to another along a central axis create a passageway when the valve is open. Thus, by turning actuator coupling 210, the bore can be aligned with the openings in hopper 101 and meter chamber 202 allowing product to flow through valve 201. Alternatively, actuator coupling 210 can be rotated so that the bore is perpendicular to the openings of hopper 101 and meter bin 202 so that product cannot flow through valves 201 and vacuum and air cannot move between hopper 101 and meter chamber 202.

Lower valve 203 operates in a similar manner and is controlled by actuator coupling 215 in the manner similar to that described above in relation to upper valve 201. Actuator coupling 215 is rotated to open and close lower valve 203. When lower valve 203 is open, meter chamber 202 is open to the atmosphere and any coffee beans stored in meter chamber 202 fall down through chute 108. When valve 203 is closed, meter chamber 202 is isolated from atmospheric pressure and can be placed under vacuum.

Meter chamber 202 is preferably formed by an upper housing 211 and lower housing 213 which are joined at juncture 212. Juncture 212 may be an O-ring coupling, or a threaded coupling in a preferred embodiment. It is important that juncture 212 form an airtight seal between the upper and lower housings. Alternatively, an integral single piece structure may be used for meter chamber 202 but this may be more difficult to manufacture.

An important feature of metering chamber 202 is that it is precisely sized to hold a particular volume of product. In the preferred embodiment, metering chamber 202 is sized to hold approximately one-quarter pound of roasted coffee beans. Spacers 224 are removable inserts made of a material such as plastic. Spacers 224 serve to decrease the volume of metering chamber 202 to compensate for varying density of coffee beans. In this manner, metering chamber 202 can be sized precisely to deliver a repeatable and accurate weight of flowable food product such as coffee beans.

Meter chamber 202 is coupled to a vacuum source, such as vacuum pump 701 shown in FIG. 7, via a port 225. Port 225 is positioned in any convenient location in a wall of meter chamber 202. In the preferred embodiment, port 225 is the only source of vacuum for dispenser 100, and the vacuum maintained in hopper 101 is achieved by the vacuum applied to meter chamber 202 through port 225.

Figure 3:
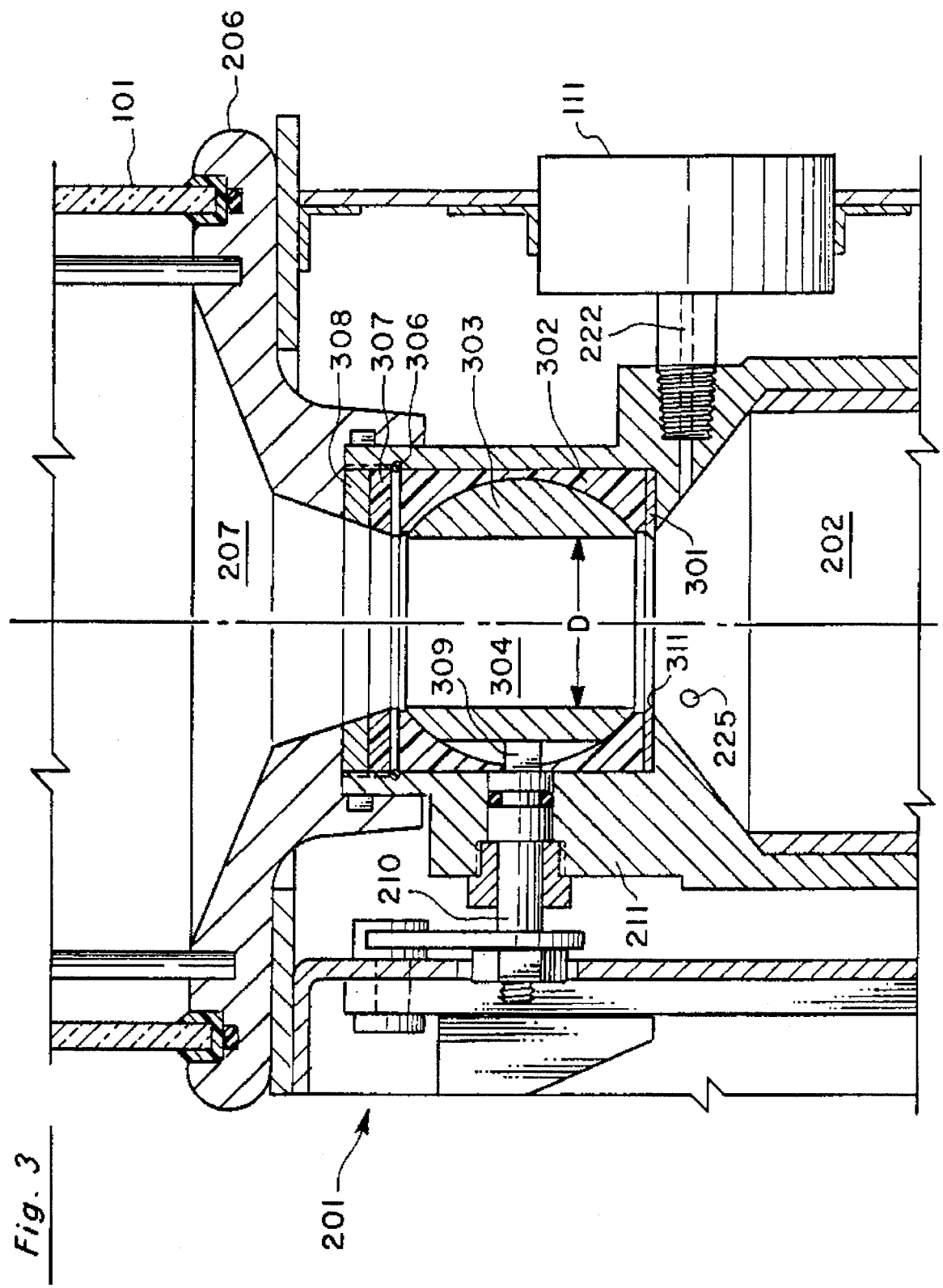
FIG. 3 shows and exploded view of one valve used in the valve assembly shown in FIG. 2.

Referring now to FIG. 3, details of valve 201 are shown. It should be understood that valve 201 and valve 203 are substantially similar in construction, and so a detailed explanation of valve assembly 201 applies also to the construction and operation of valve assembly 203. Upper metering chamber 211 is shaped to provide a substantially rectangular cavity centered directly over the opening to metering chamber 202. The opening is preferably cylindrically shaped, although a rectangular or square shape would also work.

Bean cutter 301 is a flat, ring-shaped plastic or metal structure shaped to provide a cutting surface at the junction of valve 201 and meter chamber 202. Similar cutting surfaces can be formed at the junction between valve 201 and hopper base 206 and at the junction between valve 203 (shown in FIG. 2) and meter chamber 202.

Bean cutter 301 serves to cut any beans that may be positioned so as to block closing of the valve in operation. Bean cutter 301 is formed of metal or plastic and has a tapered inner surface 311 which forms a blade-like cutting surface for cutting beans. Without a bean cutter 308, coffee beans may jam near the junction of metering chamber 202 and ball 303 when ball 303 is turned.

Socket 302 is a plastic or Teflon shaped socket that fits on top of bean cutter 301. Socket 302 has exterior dimensions sized to fit snugly in the cavity formed by housing 211. Socket 302 has a curved inner surface which is shaped to match the outer surface of ball 303. The inner surface of socket 302 is designed to provide a low friction interface between ball 303 and socket 302. This allows ball 303 to slide easily without lubrication in order to open and close the valve. Ball 303 fits into socket 302 and there is substantially a spherically shaped ball made of stainless steel or similar material. Bore 304 extends from one end of ball 303 to another end of ball 303 to allow a passage completely through ball 303. In a preferred embodiment, bore 304 is approximately one and one-quarter inch in diameter to allow free flow of a wide variety of coffee beans. The arrow labeled D in FIG. 3 indicates this diameter.

It should be understood that ball 303 rotates to open and close valve 201. As shown in FIG. 3, valve 201 is open when bore 304 is aligned with and creates a passage between hopper 101 and metering chamber 202. When ball 303 is rotated, bore 304 no longer connects metering chamber 202 with bin 301, and valve 201 is essentially closed. In order to maintain product in hopper 101 in a vacuum, valve 201 must form an airtight seal between hopper 101 and metering chamber 202. This is because metering chamber 202 will be periodically brought to atmospheric pressure during use. This great pressure differential makes it difficult to simultaneously obtain an airtight seal with valve 201 and make valve 201 easy to operate. The ball valve structure shown in FIG. 3 accomplishes these tasks. Other valve arrangements may be known or adapted to provide adequate service, however.

Funnel portion 207 of hopper base 206 is positioned against the outer surface of ball 303. O-ring 306 is positioned over the assembly. O-ring 306 comprises a resilient material so that when compressed it applies pressure to the interface between hopper base 206 and ball 303 to provide an airtight seal. Spacer 307 and lock ring 308 are shaped as threaded disks which screw into a threaded upper portion of housing 211. Spacer 307 and lock ring 308 are screwed down to apply pressure to O-ring 306 to create the airtight seal.

Ball valve 303 has a cavity 309 formed in one side. Cavity 309 is preferably oriented at 90 degrees from bore 304. Cavity 309 is sized and shaped to receive one end of actuator coupling 210. In this manner when actuator coupling 210 is rotated, ball 303 rotates about an axis running through the center of actuator coupling 210 and the center of ball 303 thereby sealing or unsealing valve 201.

It should be understood that other valve arrangements can be used although the ball valve arrangement shown in FIG. 3 is believed to be particularly advantageous. The materials identified for the piece-parts of the valve assembly 201 are given as examples only, as other materials may be used to meet the needs of a particular application.

3. Actuator Mechanism Detail

FIG. 4(a) illustrates a cross sectional view of the actuator and control mechanism in accordance with the present invention. Motor 401 is a reversible AC or DC motor. Motor 401 is affixed to alignment plate 205 (also shown in FIG. 2).

When switched on, motor 401 rotates in a first direction (i.e., clockwise) then reverses and runs in the opposite direction under the control of a control circuit (not shown). Preferably, actuator assembly 400 includes some means for detecting the position of follower assembly 404. This can be provided by limit switches (not shown) mounted on guide plate 205, linear transducers, opto-electronic position sensors, or the like. The position information thus obtained is fed back into the control circuit to stop motor 401 when it reaches predetermined positions. Details of the position sensors and control circuit are not necessary for a clear understanding of the present invention. Many well-known control circuits can be used in accordance with the present invention.

A spindle of motor 401 is coupled to lead screw 403 by mechanical coupling 402. Mechanical coupling 402 can be any well known structure for affixing two cylindrical objects. Thus, lead screw 403 turns clockwise and counter-clockwise with motor 401. Follower assembly 404 is rigidly attached to a shuttle plate 406. Follower assembly 404 and shuttle plate 406 move up and down along the length of lead screw 403 as motor 401 turns.

Alignment plate 205 includes guide channels 407 machined therein. An upper wheel 426 and a lower wheel 427 are mounted to shuttle plate 406 through channels 407 so that shuttle plate 406 is on one side of alignment plate 205 and wheels 426 and 427 are on the opposite side of alignment plate 205. This allows wheels 426 and 427 to move up and down with respect to alignment plate 205. Wheels 426 and 427 may or may not rotate, and can be mounted using screws, pins, or any convenient hardware.

Threaded ends of actuator couplings 210 and 215 extend through holes in alignment plate 205. Upper actuator arm 408 is mounted to the threaded end of upper actuator coupling 210. Likewise, lower actuator arm 409 is mounted to the threaded end of lower actuator coupling 215. The general location of actuator couplings 210 and 215 are shown in FIG. 4(b) for ease of reference, although it should be understood that actuator couplings 210 and 215 may be hidden by the hardware used to mount actuator arms 408 and 409 to the actuator couplings 210 and 215.

As best illustrated in FIG. 4(b), upper actuator arm 408 and lower actuator arm 409 are free to rotate through at least a ninety degree angle with respect to alignment plate 205. Actuator arm 408 is mounted so as to pivot about a central axis of actuator coupling 210. Likewise, actuator arm 409 is mounted so as to pivot about a central axis of actuator coupling 215. A nut turned onto the threaded ends of actuator couplings 210 and 215 is a simple and effective way to mount actuator arms 408 and 409.

At one end of each of actuator arms 408 and 409, U-shaped grooves 416 and 417 are formed, respectively. Groove 416 is sized and positioned to engage wheel 426 as shuttle 406 moves up and down. Likewise, groove 417 is sized and positioned to engage wheel 427 as shuttle 406 moves up and down. It should be apparent that actuator arms 408 and 409 could be configured in a wide variety of shapes and still achieve the stated functional objectives.

In a particular example illustrated in FIG. 4C, as shuttle plate 406 is driven upward, actuator coupling 210 is turned so as to open valve 201. In this upper position, actuator coupling 215 is turned so as to close lower valve 213. This upper position is the resting position for dispenser 100 in the preferred embodiment.

As shuttle plate 406 moves down, upper actuator arm 408 turns actuator coupling 210 so as to close upper valve 201. Only after valve 201 is closed will lower actuator arm 409 engage actuator coupling 215 so as to cause actuator coupling 215 to turn to open lower valve 203. An important feature of the preferred embodiment is that this arrangement closes upper valve 201 thus sealing metering chamber 202 (shown in FIG. 2) before lower valve 203 is opened. This preserves vacuum in hopper 101 during the dispensing operation.

Preferably, wheels 426 and 427 are spaced vertically from each other by a distance sufficient to allow some delay or lag after upper valve 201 is closed and before lower valve 203 is opened. This creates a middle position for shuttle 406 in which both upper valve 201 and lower valve 203 are closed. This middle position is used to isolate meter chamber 202 from hopper 101 (shown in FIG. 1) when hopper 101 is loaded with flowable food product such as coffee beans.

Another feature of the present invention is a mechanical vacuum switch 421 is mounted to alignment plate 205 and used selectively couple vacuum from inlet line 422 to outlet 423. Outlet 423 is coupled via vacuum port 225 to the interior of metering chamber 202 (shown in FIG. 2). Switch 421 is activated (opened) by an extension formed on lower actuator arm 409 when lower actuator arm 409 is turned fully counter clockwise (i.e., when shuttle 406 is in the upper position).

When lower actuator arm 409 first engages actuator coupling 215 on the downward travel of shuttle 406, switch 421 is closed, cutting off vacuum to meter chamber 202 before lower valve 203 is opened. In this manner, the vacuum pump (shown in FIG. 7) can be disconnected from the interior of metering chamber 202 before lower valve 203 is opened. This action prevents unnecessary or excessive pumping while lower valve 203 is open to atmospheric pressure.

In summary, actuator mechanism 400 serves to synchronously drive upper valve 201 and lower valve 203. It should be understood that actuator and control mechanism shown in FIG. 4(a) and FIG. 4(b) is only an example and a wide variety of mechanical and electrical control structures can be used. Although the design shown in FIG. 4(a) and FIG. 4(b) uses a single motor and a mechanical control mechanism to synchronize the valve operations, it should be understood that each valve could be supplied with a separate motor. Also, in some applications it is desirable to provide a pneumatic drive rather than an electric motor 401. The particular method chosen is a matter of design choice to meet the needs of a particular application.

4. Top Assembly Detail

FIG. 5 illustrates detail of top assembly 102, which is a removable lid, and upper hopper portion 117 in accordance with the present invention. It is, of course, important that hopper 101 be easily opened so that it can be filled with product. It is also important that the removable opening readily forms an airtight seal with minimal leak so that hopper 101 can be evacuated once filled. As shown in FIG. 5, upper portion 117 of hopper 101 fits onto the glass wall portion of hopper 101 and seals using O-ring 501. Ordinarily, beans will not fill the upper portion 117 of hopper 101 and so upper portion 117 will be essentially evacuated space.

Upper portion 117 seals against top assembly 102 using an O-ring seal in the preferred embodiment. Top assembly 102 includes a disk-shaped base plate 503 and a dome 505. Top assembly 102 is removable from hopper 101 when there is no vacuum in hopper 101. The vacuum inside hopper 101 essentially pulls lid 102 downward against O-ring 502 to create the seal and to apply force sufficient to hold lid 102 in a fixed position on upper portion 117. Interior 506 of dome 505 is essentially empty space held at atmospheric pressure and sealed from hopper 101 by lid base 503. The dome shape for lid 102 is for aesthetic purposes only and so can take any convenient or appealing shape.

Bleeder valve 114 includes a handle 508, channel 507, and port 511. Bleeder valve 114 serves to port atmospheric pressure into hopper 101 when activated to release the vacuum inside hopper 101. Once the vacuum inside hopper 101 is released, top assembly 102 can be easily removed. In the particular example, handle 508 is rotated so as to expose a vent allowing air to pass through the vent through channel 507 to port 511. Any convenient valve assembly can also be used.

5. Hopper 101 Assembly

Hopper 101 may be formed from a single tube or from multiple segments. In the preferred example, hopper 101 is one-eighth inch thick glass formed in a cylinder with an inside diameter of about 6 inches and an outside diameter of about 7 inches. FIG. 6 illustrates the details when a segmented design is used rather than a single piece tube. The advantages of a segmented design are that it is easily adjustable to accommodate larger or smaller quantities of beans, and that it is easily disassembled for cleaning and storage.

First segment 101a and second hopper segment 101b are substantially the same. Sealing ring 116 is a metal ring which can be tightened to rigidly affix segment 101a to segment 101b. O-rings 601 and 602 are provided in sealing ring 116 so that the glass walls of segments 101a and 101b form an airtight seal against sealing ring 116. Sealing ring 116 serves to mechanically couple and pressurize O-rings 601 and 602 so as to form the airtight seal.

When a segmented design such as that shown in FIG. 6 is used, any number of segments may be combined, limited only by weight, stability and size constraints. It should be understood that the multi-segment design shown in FIG. 6 is optional only, and that a single tube design for hopper 101 is adequate for many applications.

6. Vacuum Mechanism Schematic

FIG. 7 illustrates in schematic form the vacuum system used in a particular example of the dispenser in accordance with the present invention. Basic elements described hereinbefore are shown in block or schematic form for ease of understanding. Vacuum pump 701 is a conventional vacuum pump and in a particular example provides a vacuum on line 702 and preferably can pump at a rate of five to ten cubic feet per minute to a vacuum of twenty to twenty-five inches of mercury (in-Hg).

Vacuum switch 703 serves to turn on or activate pump 701 when pressure in vacuum line 704 rises above a predetermined level. In other words, vacuum pump 701 only operates when the vacuum on the dispenser side of the pump has been broken for some reason. Vacuum line 704 couples to actuator and control mechanism 400 at vacuum inlet 422 (shown in FIG. 4). As described earlier in reference to FIG. 4, actuator and control mechanism 400 includes mechanical switch 421 which cuts off the vacuum between line 704 and line 423 when valve 203 is opened. Actuator and control mechanism 400 directly controls the operation of upper valve 201 and lower valve 203 as well as controlling mechanical switch 221.

Metering chamber 202 is sealed by valves 201 and 203 to form an airlock arrangement as described hereinbefore. Whenever valve 203 is closed so that metering chamber 202 is sealed from atmospheric pressure, vacuum line 704 is coupled to vacuum line 705. Vacuum switch 703 serves to apply vacuum and thereby evacuate metering chamber 202 whenever valve 203 is closed. Hopper 101 is evacuated, in turn, only when valve 201 is opened.

7. Operation of the Dispenser System

Dispenser 100 in accordance with the present invention must perform two basic functions. In a dispense mode, coffee is stored under vacuum and dispensed on demand calling for synchronous operation of valves 201 and 203. In a refill mode, dispenser 100 closes both valves 201 and 203 to allow hopper 101 to be refilled. The mode is chosen using switch 113 shown in FIG. 3. The method in accordance with the present invention remains in refill mode until refill is complete. Details of these mode of operation are set out below.

The method of operation in accordance with the present invention begins in a standby mode as dispenser 100 waits for user input. In standby mode 800 (shown in FIG. 8), the upper valve 201 is opened while the lower valve 203 is closed. Meter chamber 202 is filled with coffee beans. In standby mode the system waits for user input in step 802 which is provided by switch 112 shown in FIG. 1. If no user input is received, the method remains in the standby mode.

A dispense mode is initiated when a user presses switch 112 to operate dispenser 100. In dispense mode, upper valve 201 is closed in step 804. This is followed by shutting off vacuum to meter chamber 202 during step 806. Only after the vacuum is shut off in step 806, lower valve 203 is opened in step 808. At this point, a fixed delay or pause occurs to ensure that the meter chamber 202 empties its entire contents during step 810.

When switch 113 (shown in FIG. 1) is activated to indicate refill mode, steps 820 and 822 cause the process to pause, allowing manual refilling of hopper 101. The process of bleeding air into hopper 101, removing top assembly 202 and refilling hopper 101 are performed manually in the preferred embodiment and so step 822 represents an indefinite delay until hopper 101 is refilled. Alternatively, circuitry may be added to detect when hopper 101 is refilled or other mechanism provided for automatically refilling hopper 101 in which case step 822 could be a predetermined fixed delay. Once hopper 101 is filled and top assembly 102 replaced, the user operates refill switch 113 and the process returns to step 812.

Once meter chamber 202 is empty or the refill operation is complete, lower valve 203 is closed in step 812. After lower valve 802 is closed, vacuum is applied to meter chamber 202 during step 814. Once the vacuum is reestablished in meter chamber 202, upper valve 201 is opened during step 816. The opening of upper 201 results in a transfer of beans from hopper 101 to meter chamber 202 during step 818. At this point the dispenser returns to standby mode as indicated by box 820 waiting for user input.

It should be understood that variations of the method set out in FIG. 8 are possible without departing from the inventive features of the present invention. For example, delays may be added between the steps. Likewise, the method may be paused for an indefinite amount of time at any stage to perform subroutines or other processes in addition to those set out in the present invention. Likewise, unless otherwise specified, the steps in accordance with the present invention may be performed in any order.

It should be appreciated that an improved dispenser and storage system for flowable food product such as coffee beans and other similar products is provided. It is to be expressly understood that the claimed invention is not to be limited to the description of the preferred embodiment, but to encompass other modifications and alterations within the scope and spirit within the inventive concept.

We claim:

1. A system for storing and dispensing flowable food product into an external environment at atmospheric pressure comprising:

means including a first chamber for storing the flowable food product;

air-tight seals coupled to the first chamber to isolate the first chamber from the external environment; and means including a second chamber for removing a quantity of the flowable food product from the means for storing while maintaining the means for storing substantially isolated from the external environment, wherein said second chamber is positioned beneath the means for storing and the means for removing further comprises:

a first valve positioned between the means for storing and the second chamber, the first valve sized to allow the coffee beans to pass from the means for storing to the second chamber, wherein the first valve serves as one of the air tight seals to selectively isolate the second chamber from the means for storing; and a second valve positioned beneath the second chamber, the second valve sized to allow the coffee beans to pass from the second chamber to the external environment, wherein the second valve is air tight to selectively isolate the second chamber from the external environment.

2. The system of claim 1 further comprising a vacuum pump coupled to the second chamber so as to evacuate the second chamber.

3. The system of claim 2 wherein the means for storing is evacuated by opening the first valve while the second chamber is evacuated.

4. The system of claim 1 wherein the first and second valves are configured as ball valves comprising:

a housing having a cavity formed therein; and a spherical ball having a bore through a central axis, the bore sized to allow coffee beans to flow through in a first position and an outer surface of the ball making an airtight seal between the second chamber and the means for storing in a second position.

5. The system of claim 1 further comprising actuator means for controlling the first and second valves such that the first and second valves cannot simultaneously be open.

6. A system for storing and dispensing flowable food product into an external environment at atmospheric pressure comprising:

means including a first chamber for storing the flowable food product;

air-tight seals coupled to the first chamber to isolate the first chamber from the external environment; and means including a second chamber for removing a quantity of the flowable food product from the means for storing while maintaining the means for storing substantially isolated from the external environment, wherein the means for storing is filled with an inert gas.

7. A method for dispensing flowable product from a hopper, particularly roasted coffee beans, the method comprising the steps of:

providing an upper valve having an inlet coupled to the hopper and an outlet, the upper valve initially being open;

providing a chamber coupled to the upper valve outlet;

providing a lower valve having an inlet coupled to the chamber and an outlet for dispensing the product, the lower valve initially being closed;

applying a vacuum source to the chamber to evacuate gasses from the chamber;

filling the cheer with the product by flowing the product from the hopper through the upper valve to the chamber;

closing the upper valve;

shutting off the vacuum source to the chamber; and only after the vacuum is shut off, opening the lower valve to dispense the contents of the chamber through the outlet of the lower valve.

8. The method of claim 7 further comprising the steps of:

closing the lower valve after the product is dispensed;

reapplying the vacuum source to the chamber;

opening the upper valve; and transferring the product from hopper to the chamber.

9. The method of claim 7 further comprising the steps of:

after the step of closing the upper valve, bleeding air into the hopper;

opening the hopper;

refilling the hopper;

closing the hopper with an airtight seal;

opening the upper valve, thereby coupling the chamber to the hopper; and evacuating the hopper using the vacuum source coupled to the chamber.

10. An apparatus for dispensing a predetermined quantity of product from a hopper, the apparatus comprising:

a first valve having an inlet coupled to the hopper and having an outlet;

a meter chamber coupled to the outlet of the first valve, the meter chamber having a fixed volume defined by a plurality of inner walls;

a second valve having an inlet coupled to the meter chamber and having an outlet for dispensing the product into an external environment;

an actuator for controlling the first and second valves allowing the first and second valves to be simultaneously closed to isolate the meter chamber from the hopper and isolate the meter chamber from the external environment; and a removable insert affixed to at least some of the plurality of inner walls for decreasing the volume of the meter chamber.

11. The apparatus of claim 10 wherein the volume displaced by the removable insert is determined by density of the product.

12. The apparatus of claim 10 wherein the first and second valves are non-metering valves.

13. A valve assembly for removing a fixed quantity of flowable product from a pressure isolated storage container, the valve assembly comprising:

an upper valve having an opening sized to allow the product to flow through when the upper valve is open, the upper valve making an airtight seal with the storage container when closed;

a meter chamber having an inner surface, the chamber adapted to receive the product from the upper valve;

a removable insert affixed to the inner surface of the meter chamber for reducing volume inside the meter chamber, the size of the removable insert determined by density of the product; and a lower valve having an opening sized to allow the product to flow through when the lower valve is open, the lower valve making an airtight seal with the meter chamber when closed.

14. The valve assembly of claim 13 further comprising a port located in a wall of the meter chamber for receiving a vacuum line from an external vacuum source.

15. The valve assembly of claim 13 further comprising an actuator means coupled to the upper valve and the lower valve for synchronously operating the upper and lower valves.

16. The valve assembly of claim 15, the actuator means further comprising a vacuum switch, the vacuum switch having an inlet coupled to an external vacuum source and an outlet coupled to the meter chamber.

17. The valve assembly of claim 16 wherein the upper valve includes a cutting surface positioned at a junction between the upper valve and the meter chamber.

18. The valve assembly of claim 17 wherein the lower valve includes a cutting surface positioned at a junction between the lower valve and the meter chamber.

* * * * *